US012743626B2

(12) United States Patent
Figueredo de Santana et al.

(10) Patent No.: US 12,743,626 B2
(45) Date of Patent: Sep. 22, 2026

(54) AI MODEL RECOMMENDATION BASED ON SYSTEM TASK ANALYSIS AND INTERACTION DATA

(71) Applicant: INTERNATIONAL BUSINESS MACHINES CORPORATION, Armonk, NY (US)

(72) Inventors: Vagner Figueredo de Santana, São Paulo (BR); Larissa Monteiro da Fonseca Galeno, Niterói (BR); Emilio Ashton Vital Brazil, Rio de Janeiro (BR); Renato Fontoura de Gusmao Cerqueira, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 18/113,243

(22) Filed: Feb. 23, 2023

(65) Prior Publication Data

US 2024/0289622 A1 Aug. 29, 2024

(51) Int. Cl.
*G06N 3/084* (2023.01)

(52) U.S. Cl.
CPC .................................... *G06N 3/084* (2013.01)

(58) Field of Classification Search
CPC ............................... G06N 3/084; G06N 20/00
See application file for complete search history.

(56) References Cited

U.S. PATENT DOCUMENTS 8,095,523 B2 1/2012 Brave et al.
9,400,995 B2 7/2016 Gu et al.
10,223,135 B2 3/2019 Larabie-Belanger
10,706,841 B2 7/2020 Gruber et al.
11,158,204 B2 * 10/2021 Harlow .................... G06N 7/00
(Continued)

FOREIGN PATENT DOCUMENTS

BR 102012033123 10/2021
WO 2001080177 10/2001

OTHER PUBLICATIONS

Figuerêdo de Santana et al., "Summarizing Observational Client-side Data to Reveal Web Usage Patterns", Proceedings of the 2010 ACM Symposium on Applied Computing (SAC '10), Mar. 22-26, 2010; pp. 1219-1223.
(Continued)

*Primary Examiner* — Huawen A Peng
(74) *Attorney, Agent, or Firm* — Seed Intellectual Property Law Group LLP

(57) ABSTRACT

In a first aspect of the invention, there is a computer-implemented method including: generate, by a processor set, an interaction usage graph based on user interaction data on user interactions with an analytical system user interface; generate, by the processor set, an interaction embedding model in a vector space based on the interaction usage graph; determine, by the processor set and based on the interaction embedding model in the vector space, a similarity of a portion of the interaction embedding model that corresponds to a particular analytical task among the user interactions with the analytical system user interface with a particular machine learning model from a set of one or more machine learning models; and output, by the processor set, to the analytical system user interface, an indication of the particular machine learning model.

20 Claims, 8 Drawing Sheets

(56) References Cited

U.S. PATENT DOCUMENTS

| | | | | |
|---|---|---|---|---|
| 11,194,597 | B2 | 12/2021 | Valtchev | |
| 12,093,266 | B2 * | 9/2024 | Katariya | G06F 16/24575 |
| 2015/0120722 | A1 | 4/2015 | Martinez et al. | |
| 2019/0362222 | A1 | 11/2019 | Chen | |
| 2020/0326822 | A1 * | 10/2020 | Sultan | G06F 3/04812 |
| 2021/0019325 | A1 * | 1/2021 | Edge | G06F 16/9024 |
| 2021/0279279 | A1 | 9/2021 | Appel et al. | |
| 2022/0122099 | A1 * | 4/2022 | Ning | G06Q 30/0202 |
| 2022/0327637 | A1 * | 10/2022 | Shah | G06Q 50/01 |
| 2022/0382565 | A1 * | 12/2022 | Sunkara | G06N 3/0895 |
| 2023/0153340 | A1 * | 5/2023 | K | G06N 3/045 704/9 |
| 2023/0245169 | A1 * | 8/2023 | Korlimarla | G06Q 30/0253 705/14.51 |
| 2024/0028646 | A1 * | 1/2024 | Ramsl | G06F 16/9024 |
| 2024/0054356 | A1 * | 2/2024 | Liu | G06N 20/00 |
| 2024/0220810 | A1 * | 7/2024 | Javari | G06N 3/091 |
| 2024/0370723 | A1 * | 11/2024 | Bisson-Krol | G06F 18/41 |
| 2025/0077963 | A1 * | 3/2025 | Shin | G06F 21/41 |

OTHER PUBLICATIONS

Françoise et al., "Marcelle:Composing Interactive Machine Learning Workflows and Interfaces", 34th Annual ACM Symposium on User Interface Software and Technology (UIST '21), Oct. 10-14, 2021; pp. 39-53.

Langer et al., "System Design to Utilize Domain Expertise for Visual Exploratory Data Analysis", Information 2021, http://doi.org/10.1145/3356422.3356434; 2021; 16 Pages.

Anonymous, "Ranking and Automatic Selection of Machine Learning Models", https://ip.com/IPCOM/000252275, Jan. 3, 2018; 34 Pages.

Anonymous, "Visualization Recommendation System Using a Hybrid Machine Learning Approach", https://ip.com/IPCOM/000260192, Oct. 30, 2019; 4 Pages.

* cited by examiner

INSTRUMENTED ANALYTICAL SYSTEM UI

411

Risk Assessment Visual Analytics

Explorer

XYZ Company

Data Analogues Revenue Forecast

View as:

Accts receivable days

| | |
|---|---|
| LOG Revenue 2018 Q4 | 19.51 |
| LOG Revenue 2019 Q1 | 19.55 |
| LOG Revenue 2019 Q2 | 19.59 |
| LOG Revenue 2019 Q3 | 19.62 |
| LOG Revenue 2019 Q4 | 19.64 |
| LOG Revenue 2020 Q1 | 19.69 |
| LOG Revenue 2020 Q2 | 19.74 |
| LOG Revenue 2020 Q3 | 19.71 |
| LOG Revenue 2020 Q4 | 20.03 |
| Piotroski F-Score | 5 |
| Receivables percentage current assets | 23.98 |
| Receivables turnover ratio | 3.2 |
| Short-term debt as percentage of total debt | 0.68 |

Export Data Import Data Compare with other items

FIG. 4B

ANALYTICAL SYSTEM UI USER INTERACTION LOG 421

| | sid | timestamp | event | target | info |
|---|---|---|---|---|---|
| 0 | SID0.00279368252124412З | 698484128 | pageview | [object Window] | {"URL":"https://brl-rrf.bx.cloud9.ibm.com/uilo... |
| 1 | SID0.002793682521244123 | 698484454 | mouseover | div#mainFull | {"X":898,"Y":56,"which":1} |
| 2 | SID0.002793682521244123 | 698484456 | mousemove | div#mainFull | {"X":898,"Y":56,"which":1} |
| 3 | SID0.002793682521244123 | 698484505 | mouseout | div#mainFull | {"X":932,"Y":255,"which":1} |
| 4 | SID0.002793682521244123 | 698484555 | mouseover | div#step1 | {"X":959,"Y":339,"which":1} |
| ... | ... | ... | ... | ... | ... |
| 166236 | SID0.9976098291455175 | 344102159 | mousemove | div#mainFull | {"X":289,"Y":67} |
| 166237 | SID0.9976098291455175 | 344102175 | mousemove | div#mainFull | {"X":287,"Y":58} |
| 166238 | SID0.9976098291455175 | 344102191 | mouseout | div#mainFull | {"X":286,"Y":47} |
| 166239 | SID0.9976098291455175 | 344102192 | mouseover | div#header | {"X":286,"Y":47} |
| 166240 | SID0.9976098291455175 | 344102193 | mousefixation | div#header | {"X":288,"Y":65} |

FIG. 4C

AI MODEL RECOMMENDATION BASED ON SYSTEM TASK ANALYSIS AND INTERACTION DATA

BACKGROUND

Aspects of the present invention relate generally to machine learning and, more particularly, to machine learning (ML)/artificial intelligence (AI) systems for applying AI to facilitate usage of analytical systems.

Analytical software systems, such as knowledge-centric systems and accelerated discovery systems (e.g., in financial analysis or in scientific, medical, or engineering research or development) often combine multiple analytical tasks and multiple AI models. New AI models may be added to these analytical systems over time. Users may remain unaware of new AI models as they are added to such analytical systems, and may continue to use such systems in accordance with their established familiarity with such systems.

SUMMARY

In a first aspect of the invention, there is a computer-implemented method including: generate, by a processor set, an interaction usage graph based on user interaction data on user interactions with an analytical system user interface; generate, by the processor set, an interaction embedding model in a vector space based on the interaction usage graph; determine, by the processor set and based on the interaction embedding model in the vector space, a similarity of a portion of the interaction embedding model that corresponds to a particular analytical task among the user interactions with the analytical system user interface with a particular machine learning model from a set of one or more machine learning models; and output, by the processor set, to the analytical system user interface, an indication of the particular machine learning model.

In another aspect of the invention, there is a computer program product including one or more computer readable storage media having program instructions collectively stored on the one or more computer readable storage media. The program instructions are executable to: generate an interaction usage graph based on user interaction data on user interactions with an analytical system user interface; generate an interaction embedding model in a vector space based on the interaction usage graph; determine, based on the interaction embedding model in the vector space, a similarity of a portion of the interaction embedding model that corresponds to a particular analytical task among the user interactions with the analytical system user interface with a particular machine learning model from a set of one or more machine learning models; and output, to the analytical system user interface, an indication of the particular machine learning model.

In another aspect of the invention, there is a system including a processor set, one or more computer readable storage media, and program instructions collectively stored on the one or more computer readable storage media. The program instructions are executable to: generate an interaction usage graph based on user interaction data on user interactions with an analytical system user interface; generate an interaction embedding model in a vector space based on the interaction usage graph; determine, based on the interaction embedding model in the vector space, a similarity of a portion of the interaction embedding model that corresponds to a particular analytical task among the user interactions with the analytical system user interface with a particular machine learning model from a set of one or more machine learning models; and output, to the analytical system user interface, an indication of the particular machine learning model.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 4B shows an example instrumented analytical system UI, in accordance with aspects of the present invention.

FIG. 4C shows an example instrumented analytical system UI interaction log, in accordance with aspects of the present invention.

DETAILED DESCRIPTION

Figure 1:
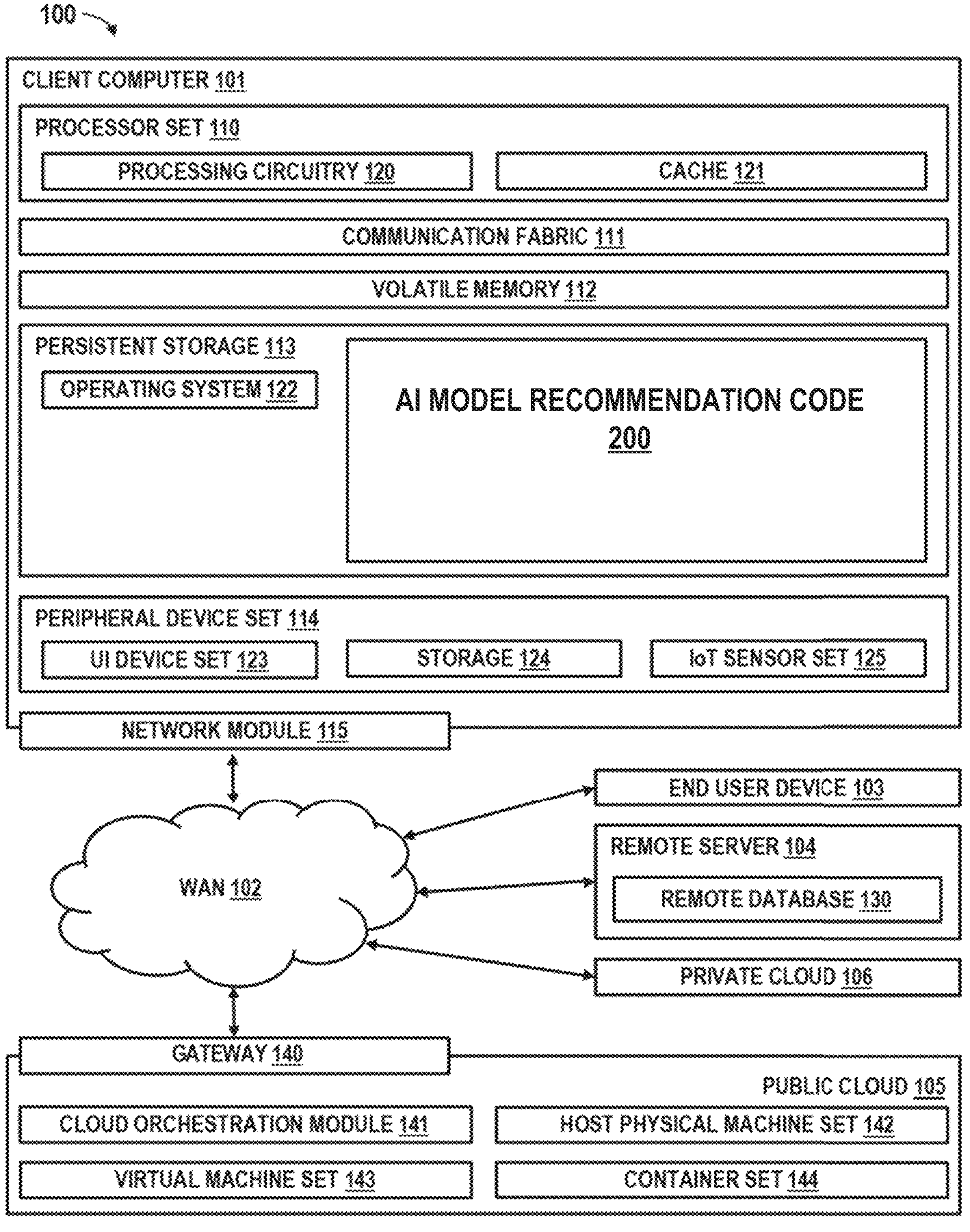
FIG. 1 depicts a computing environment according to an embodiment of the present invention.

Aspects of the present invention relate generally to analytical systems such as knowledge-centric systems and accelerated discovery systems (e.g., in financial analysis or in scientific, medical, or engineering research or development, as non-limiting examples) based on artificial intelligence (AI)/machine learning (ML) and, more particularly, to solving the challenge of user discovery of newly added AI/ML models (hereafter "AI models") to existing knowledge-centric systems, in ways that are optimized to be useful to particular users based on their needs and usage patterns. As used throughout this description and the accompanying figures and claims, "AI models" are equivalently considered as "machine learning models." Knowledge-centric systems often combine multiple tasks and multiple AI models. However, as new features, tasks, and AI models are added to these systems, users may continue performing tasks based on prior experiences and not interact with newly added AI models. In this context, among the inventive insights of this disclosure, there is a need for properly identifying tasks performed on systems combining multiple AI models, understanding user behavior, and providing users performing tasks as usual with new information, results, and capabilities made possible by newly added AI models.

According to aspects of the invention, systems, methods, and devices may compare new AI models that are newly added to existing analytical systems with the customized needs and interactions of a particular user with the existing analytical systems. Systems, methods, and devices in various examples of this invention may select newly added AI models likely to be particularly useful to the particular user (hereafter "the user") based on the user's needs and usage patterns, as analyzed via, e.g., task analysis of the user's tasks with the AI system and implicit interaction data of the user's interactions with the analytical system. Systems, methods, and devices in various examples of this invention may generate outputs to the user to introduce the newly added AI models selected as being particularly useful for the user, and providing intelligent guidance to and teaching the user how the selected especially useful newly added AI models may provide new and more advanced capabilities in the user's tasks with and usage of the analytical system, and help the user make the most of new AI-supported functions and capabilities in the analytical system.

A system of this disclosure may generate outputs to recommend AI models to a user, in response to a user performing a task related to existing AI models in a knowledge-centric system. A system of this disclosure may capture high-granularity interaction data of the user interacting with the knowledge-centric system, perform task analysis, and match user needs and/or task needs to a pool of existing AI models. In ways such as this, a system of this disclosure may show users how newly added AI models can provide predictions with newly enhanced capabilities for information otherwise similar to AI models the user is familiar working with.

Recommendation of content usually aims at one specific task and on single AI models. However, with the advent of advanced analytical systems such as knowledge-centric and accelerated discovery systems, new and complex contexts of use are emerging and many users may find it increasingly outside of their familiar working context to try to search out and seek to understand newly available AI models and how those new AI models might relevantly add new capabilities to a user's tasks and goals. A system of this disclosure provides novel ways of identifying recurrent tasks and information needs, by using high-granularity interaction data of the user's interactions with the knowledge-centric system, to recommend and provide guidance about currently available AI models and results to a task at hand, providing shortcuts to newly added AI models and capabilities, and demonstrations of how such newly added AI models and capabilities may aid the user's work and provide increased capabilities that are relevant to the user's work.

Various aspects of this disclosure are directed to systems and methods for computing recommended AI model outputs to a user. An example computer-implemented process may illustratively include some or all of the following steps. An example computer-implemented process may include, in response to interaction with a system by a user performing a task using a user interface, capturing, by the system or by another system of this disclosure, high-granularity interaction data created by interactions with the system (e.g., from mouse movements and keyboard usage associated with events captured containing target user interface elements and a timestamp when each event occurred). The system of this disclosure performing these steps may be the same system with which the user is interacting, or a separate system that observes the user interactions with the system with which the user performs the tasks, and that generates recommendation outputs to the user. The example computer-implemented process may include generating, by the system of this disclosure, a usage graph in a form of a directed graph structure representing the events triggered at the user interface and in an order in which the events occurred. The example computer-implemented process may include generating, by the system of this disclosure, graph embeddings using the usage graph. The example computer-implemented process may include computing, by the system of this disclosure, a similarity of current interaction, e.g., by comparing each event with computed embeddings to identify whether the user is approximating at least one of a sub-task and a user interface region associated with existing (e.g., pre-existing or newly existing) AI models. The example computer-implemented process may include, in response to a determination that the similarity of current interaction exceeds a predetermined threshold, matching, by the system of this disclosure, available models with the high-granularity interaction data. The example computer-implemented process may include, in response to matching a label of a user interaction with an existing model, by the system of this disclosure, running an existing model. The example computer-implemented process may include, in response to a result of the model outcome, performing, by the system of this disclosure, one of updating the model with the result, and providing additional guidance associated with a task at hand to the user.

Implementations of the invention are necessarily rooted in computer technology. For example, steps of processing user interaction graphs, which may contain thousands, millions, or any number of nodes, into machine learning embedding models, and processing machine learning models into machine learning embedding models, that is, generating respective embedding models of the machine learning models, in vector embedding spaces or higher-order tensor embedding spaces that may have hundreds, thousands, or any number of dimensions, are computer-based and cannot be performed in the human mind. Training and using a machine learning model are, by definition, performed by a computer and cannot practically be performed in the human mind (or with pen and paper) due to the complexity and massive amounts of calculations involved. For example, an artificial neural network may have millions or even billions of weights that represent connections between nodes in different layers of the model. The values of these weights are adjusted, e.g., via backpropagation or stochastic gradient descent, when training the model and are utilized in calculations when using the trained model to generate an output in real time (or near real time). Various aspects of the present disclosure are beyond the capability of mental effort not only in scale and consistency but also technically and categorically, with complexity definitively beyond the capability of human minds unaided by computers. Given this scale and complexity, it is simply not possible for the human mind, or for a person using pen and paper, to perform the number of calculations involved in training and/or using a machine learning model, as has been acknowledged and emphasized by experts in the field of art. By implementations of the invention analyzing user interactions with an analytical system, comparing the user interactions with available AI models, and outputting recommendations for available AI models to provide new capabilities in research or analysis, implementations of the invention may thereby newly enable and facilitate usage of newly available AI models that may enable new capabilities and new results in analytical system examples as diverse as financial analysis, biomedical therapeutic research, fundamental particle detection in particle physics collider chambers, and cancer detection, for example. Various implementations of the invention may thus provide technological solutions to many of the world's most important, challenging, and sophisticated technological problems.

It should be understood that, to the extent implementations of the invention collect, store, or employ personal information provided by, or obtained from, individuals (for example, any personal information that individuals may enter in a knowledge-centric system that they use in their professional work functions), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a computing environment 100 according to an embodiment of the present invention. Computing environment 100 contains an example of an environment for the execution of at least some of the computer code involved in performing the inventive methods, such as AI model recommendation code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
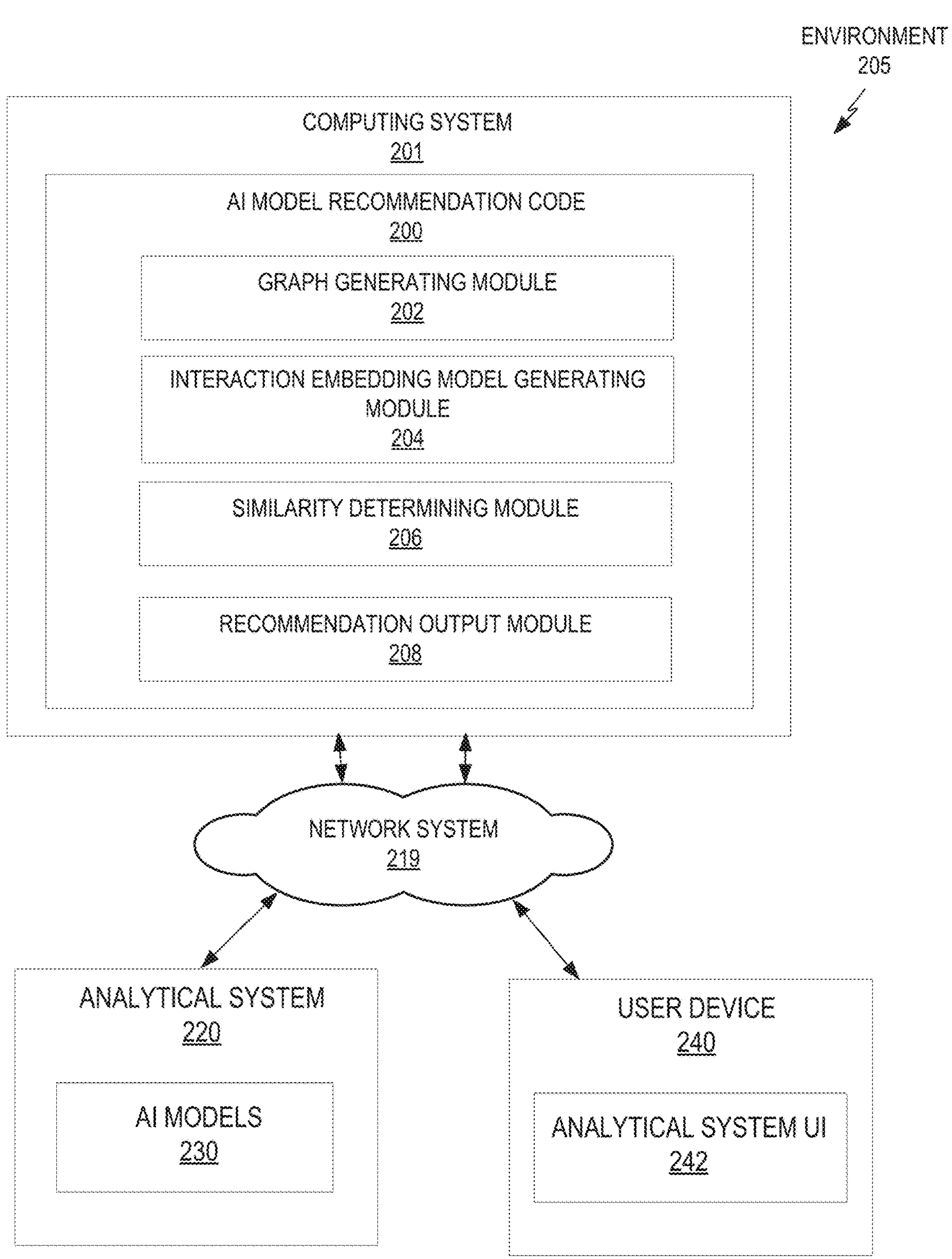
FIG. 2 shows a block diagram of an exemplary environment in accordance with aspects of the present invention.

FIG. 2 shows a block diagram of an exemplary environment 205 in accordance with aspects of the invention. In embodiments, environment 205 includes computing system 201, which implements example AI model recommendation code 200 of this disclosure, as introduced above with reference to FIG. 1. Environment 205 also includes analytical system 220 and user device 240. Analytical system 220 may be, e.g., a knowledge-centric system or accelerated discovery system (such as described above). Analytical system 220 includes AI models 230, which may be AI models that the developers or providers of analytical system 220 have newly or recently added to analytical system 220. AI models 230 may introduce or enable new or newly enhanced capabilities to analytical system 220, such as automatically generating intelligent predictions of future revenue in a financial analysis software system, or automatically generating accurate protein folding predictions in a biomedical therapeutic research analytical software system, as illustrative examples. User device 240 hosts and runs analytical system user interface (UI) 242. User device 240 is one example user device of an indefinite and arbitrarily large number of user devices that users of analytical system 220 may use to access and work with analytical system 220. In some examples, analytical system 220 may be deployed to the cloud and provided to arbitrarily large numbers of users around the world as a cloud-hosted software application via cloud implementations of network system 219 and via analytical system UI 242 of each individual's instance of user device 240.

Computing system 201 may be implemented in a variety of configurations for implementing, storing, running, and/or embodying AI model recommendation code 200. Computing system 201 may comprise one or more instances of computer 101 of FIG. 1, in various examples. Analytical system 220 may comprise or be comprised in one or more instances of client computer 101, remote server 104, private cloud 106, and public cloud 105 of FIG. 1, in various examples. Analytical system 220 and AI model recommendation code 200 may be separate, as shown in FIG. 2, in various examples, in which AI model recommendation code 200 functions cooperatively with analytical system 220. In various other examples, AI model recommendation code 200 may be added to analytical system 220 or otherwise be comprised as part of analytical system 220.

Network system 219 may comprise one or more instances of WAN 102, remote server 104, private cloud 106, and public cloud 105 of FIG. 1, in various examples. Computing system 201 in various examples may comprise a cloud-deployed computing configuration, comprising processing devices, memory devices, and data storage devices dispersed across data centers of a regional or global cloud computing system, with various levels of networking connections, such that any or all of the data, code, and functions of AI model recommendation code 200 may be distributed across this cloud computing environment. AI model recommendation code 200, computing system 201, and/or environment 205 may thus constitute and/or be considered an AI model recommendation code system, and may comprise and/or be constituted of one or more software systems, a combined hardware and software system, one or more hardware systems, components, or devices, one or more methods or processes, or other forms or embodiments.

In other examples, computing system 201 may comprise a single laptop computer, or a specialized machine learning workstation equipped with one or more graphics processing units (GPUs) and/or other specialized processing elements, or a collection of computers networked together in a local area network (LAN), or one or more server farms or data centers below the level of cloud deployment, or any of a wide variety of computing and processing system configurations, any of which may implement, store, run, and/or embody AI model recommendation code 200. AI model recommendation code 200 may interact via network system 219 with any other proximate or network-connected computing systems to analyze user interactions with analytical system 220 via analytical system UI 242, compare the user interactions with available AI models 230, and output recommendations for one or more of AI models 230 to analytical system UI 242. AI model recommendation code 200 may thereby inform the user of analytical system UI 242 of one or more of AI models 230 that may enable new capabilities or advantages in performing the user's work, and how to use those one or more AI models 230 to the user's best advantage, in various examples.

In embodiments, computing system 201 of FIG. 2, and any one or more computing devices or components thereof, comprises AI model recommendation code 200. In various embodiments, AI model recommendation code 200 comprises graph generating module 202, interaction embedding model generating module 204, similarity determining module 206, and recommendation output module 208, each of which may comprise modules of the code of block 200 of FIG. 1. These modules of the code of block 200 are executable by the processing circuitry 120 of FIG. 1 to perform the inventive methods as described herein. The term "module" here may refer to any portion or collection of software code in any form, and is not limited to any potential more restricted meaning of the term "module" that may be used in other contexts or technical domains. AI model recommendation code 200 and/or computing system 201 may include additional or fewer modules than those shown in FIG. 2. In various embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Figure 3:
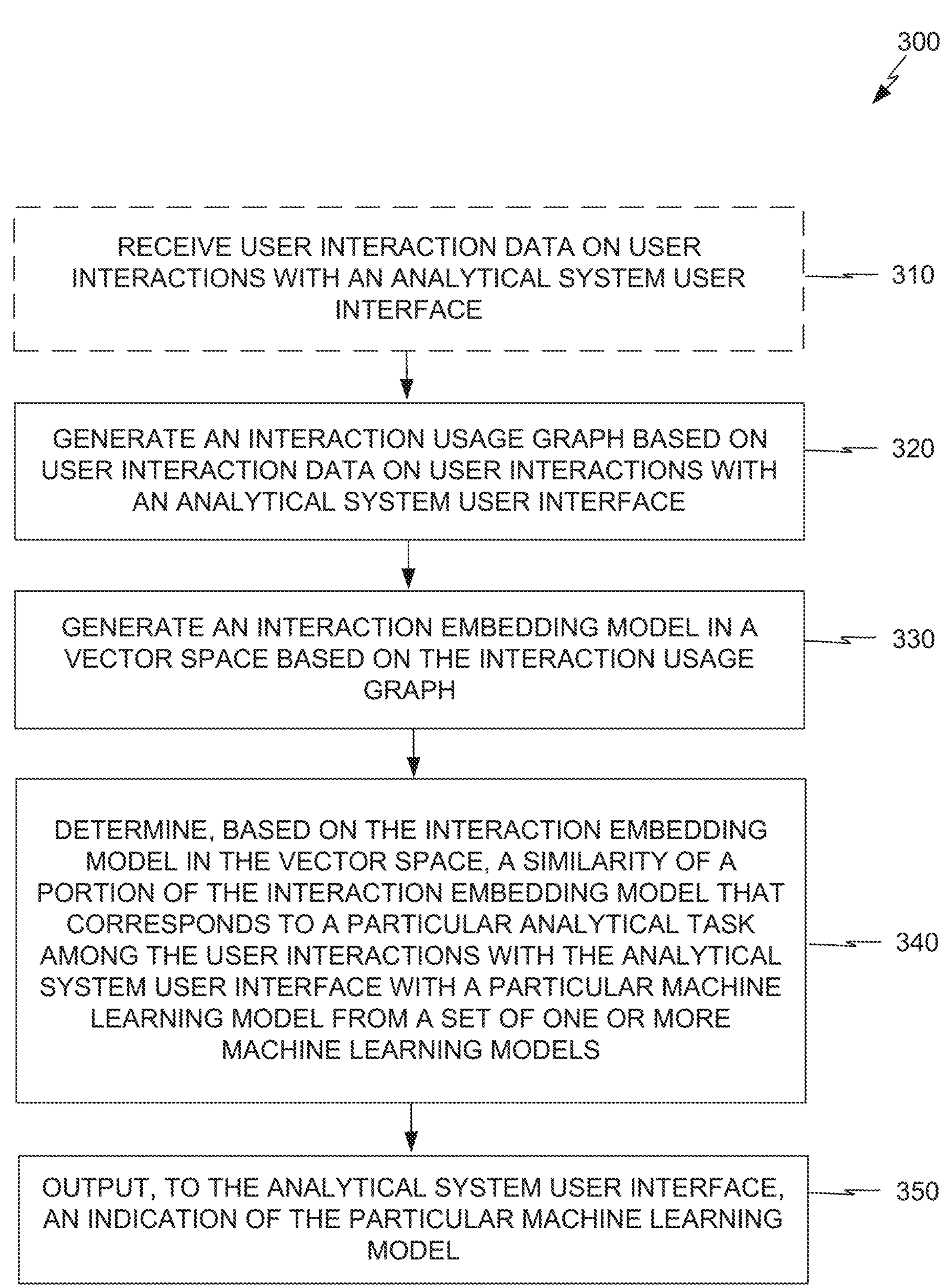
FIG. 3 shows a flowchart of an exemplary method in accordance with aspects of the present invention.

FIG. 3 shows a flowchart of an exemplary method 300 in accordance with aspects of the present invention. Steps of method 300 may be performed and carried out in environment 205 of FIG. 2, such as by one or more processing elements of processor set 110 of FIG. 1 and by a processor set of computing system 201 of FIG. 2 implementing AI model recommendation code 200, in various examples. In this context, steps of method 300 are described with reference to elements depicted in FIG. 2.

At step 310, AI model recommendation code 200 receives user interaction data on user interactions with an analytical system user interface (e.g., via a data intake module (not depicted) via analytical system UI 242 of FIG. 2), in various examples. In embodiments, and as described with respect to FIG. 2, at step 320, AI model recommendation code 200 generates an interaction usage graph based on user interaction data on user interactions with an analytical system user interface (e.g., via graph generating module 202 of FIG. 2). At step 330, AI model recommendation code 200 generates an interaction embedding model in a vector space based on the interaction usage graph (e.g., via interaction embedding model generating module 204 of FIG. 2). At step 340, AI model recommendation code 200 determines, based on the interaction embedding model in the vector space, a similarity of a portion of the interaction embedding model that corresponds to a particular analytical task among the user interactions with the analytical system user interface with a particular machine learning model from a set of one or more machine learning models (e.g., via similarity determining module 206 of FIG. 2). At step 350, AI model recommendation code 200 outputs, to the analytical system user interface, an indication of the particular machine learning model (e.g., via recommendation output module 208 of FIG. 2).

Figure 4A:
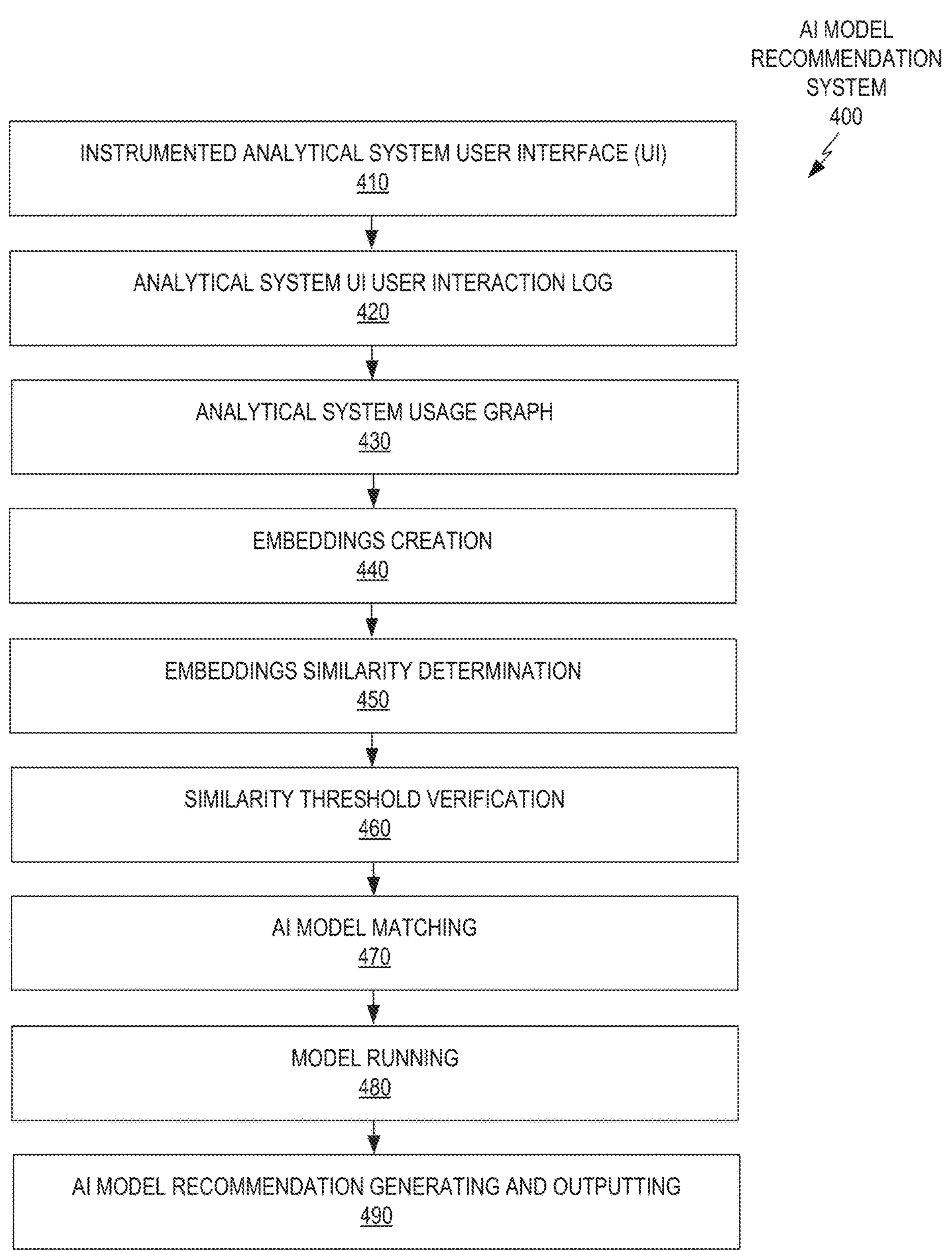
FIG. 4A shows a conceptual system diagram of an example AI model recommendation system for an example analytical system in accordance with aspects of the present invention.

FIG. 4A shows a conceptual system diagram of an example AI model recommendation system 400 for an example analytical system, in accordance with aspects of the present invention. System 400 of FIG. 4A includes a combination of various elements, modules, and method steps comprised in or performed by may be carried out in computing environments 100 and/or 205 and AI model recommendation code 200 of FIGS. 1 and 2 and method 300 of FIG. 3, in various examples. System 400 includes an instrumented analytical system user interface (UI) 410, which may be an implementation of analytical system UI 242 of FIG. 2, in various examples. A user interacts with instrumented analytical system UI 410 performing one or more analytical tasks. System 400 further includes a UI interaction log 420 that AI model recommendation code 200 may generate from a user's interactions with instrumented analytical system UI 410, and an analytical system interaction usage graph 430 (or "analytical system usage graph 430") that AI model recommendation code 200 may generate based on UI interaction log 420. With UI interaction log 420, AI model recommendation code 200 may capture interaction data, e.g., high-granularity interaction data as user-controlled mouse movements and keyboard usage. User interaction events captured may contain target UI elements and the timestamp they occurred. AI model recommendation code 200 may generate, e.g., via graph generating module 202 of FIG. 2, analytical system interaction usage graph 430 as a directed graph structure representing the events triggered at the UI and the order in which they occurred.

System 400 further includes an embeddings creation module 440 that AI model recommendation code 200 may generate, e.g., via interaction embedding model generating module 204 of FIG. 2, by processing interaction usage graph 430 into an interaction embedding space, e.g., via an algorithmic framework for representational machine learning on graphs, such as the "node2vec" framework. With embeddings creation module 440, AI model recommendation code 200 may use analytical system interaction usage graph 430 to create graph embeddings. AI model recommendation code 200 may create graph embeddings using an algorithmic framework for representational machine learning on graphs, such as node2vec, for example. AI model recommendation code 200 may generate respective embedding models of the one or more machine learning models in the vector space, to compare the embedding models of the one or more machine learning models, or portions thereof, with the embedding models of the user interactions, or portions thereof.

System 400 further includes an embeddings similarity determination module 450, which may compute and determine similarities of observed user analytical tasks with available AI models over the embeddings in embeddings creation module 440, e.g., by computing a similarity measure (e.g., cosine similarity). System 400 further includes a similarity threshold verification module 460, which may verify similarities of user analytical system task interactions determined by embeddings similarity determination module 450 with AI models. Embeddings similarity determination module 450 may be an example of similarity determination module 206 of FIG. 2. AI model recommendation code 200 via embeddings similarity determination module 450 may compute and determine a similarity of interaction, including effectively in realtime, in some examples. Embeddings similarity determination module 450 may compare each user interaction event with computed embeddings, including as a user interacts with analytical system UI 242, in some examples. Embeddings similarity determination module 450 may thereby identify whether the user is approximating (by assessing similarity) a sub-task or UI region in the embedding space associated with existing AI models, for example. Similarity threshold verification module 460 may assess and determine whether the determined similarity at least surpasses a threshold of similarity for triggering further steps.

System 400 further includes: an AI model matching module 470, which may match AI models with similar AI tasks, based on similarities verified by similarity threshold verification module 460; model running module 480, which may run one or more matched AI models that match the interactions, as determined by AI model matching module 470; and AI model recommendation generating and outputting module 490, which may output guidance via UI 410 on the one or more matching AI models as determined by AI model matching module 470 and with AI model results generated by model running module 480. AI model matching module 470 may compare available models with interaction data, and seek to match available AI models with the interaction event information that surpassed the conditional threshold verified by similarity threshold verification module 460. AI model recommendation code 200 may perform the matching by using information associated with the UI event (e.g., label, target, identifier) and existing models (e.g., predicted classes, features). Model running module 480 may run selected AI models based on UI target data labels. After matching a label (e.g., revenue) with an existing model (e.g., revenue forecast), model running module 480 may then run the existing AI model. By considering previous AI model runs, AI model recommendation code 200 may also trigger this step preemptively, or considering lower values for the similarity threshold as a way to provide recommendations to users earlier in their workflow and prior to waiting longer periods for results of user interactions to achieve close enough similarity to candidate AI models. Or, AI model recommendation code 200 may reduce the selected threshold of similarity based on updated similarity evaluation criteria learned from prior determinations of similarity of portions of the interaction embedding model with the one or more machine learning models.

AI model recommendation generating and outputting module 490 is a module for generating an AI model recommendation based on an analysis of an AI embedding set based on the user interactions in comparison with the available AI models, and outputting the AI model recommendation via the analytical system UI, in various examples. AI model recommendation generating and outputting module 490 may generate, output, or insert results or guidance on AI models and their outputs. With AI model recommendation generating and outputting module 490, AI model recommendation code 200 may add AI model outcomes and either add the results or provide additional user guidance so that the user can come to understand and benefit from results of the recommended AI models in the user's work.

FIG. 4B shows an example instrumented analytical system UI 411, which may be an implementation of instrumented analytical system UI 410 of FIG. 4A and analytical system UI 242 of FIG. 2, in accordance with aspects of the present invention. Instrumented analytical system UI 411 is an example analytical system UI that a user uses to interact with an analytical system, such as analytical system 220 of FIG. 2. As shown, instrumented analytical system UI 411 is in a display state in which the user has called up a suite of financial metrics on a particular company of interest, displaying an array of financial data and analysis scores in graphical and numerical list formats, with various interactive elements for performing further analyses on relevant aspects of the data and analyses. AI model recommendation system 400 of FIG. 4A or AI model recommendation code 200 of FIGS. 1 and 2 may receive user interaction data, such as page views, mouse movements, mouseover actions, mouse fixation actions, icon selections, keyboard usage, keyboard shortcut selections, and widget selections, interaction events with user interface (UI) elements, and timestamps of the interaction events, via instrumented analytical system UI 411, as an example of step 310 of FIG. 3 of receiving user interaction data on user interactions with an analytical system UI, in various examples. "Mouse movements" and other user interactions typically described with the term "mouse" may refer to any user control inputs of a mouse-like or cursor-like graphical user interface (GUI) selection tool, in various examples.

FIG. 4C shows an example instrumented analytical system UI interaction log 421, which may be an implementation of instrumented analytical system UI interaction log 420 of FIG. 4A, in accordance with aspects of the present invention. FIG. 4C illustratively shows the first five and the last five of 166,240 discrete user interactions of one or more defined user interaction sessions with instrumented analytical system UI 410 or 411. Each row of instrumented analytical system UI interaction log 421 lists a row number, a session identification number, a user interaction event descriptor, a UI target of the action, and information notation data, such as an indication of a URL, an x-y position of the mouse or cursor in the UI for the event, and/or a selection indicator. AI model recommendation system 400 of FIG. 4A or AI model recommendation code 200 of FIGS. 1 and 2 may receive user interaction data in the form of instrumented analytical system UI interaction log 421, in an example of step 310 of FIG. 3 of receiving user interaction data on user interactions with an analytical system UI, in various examples.

Figure 4D:
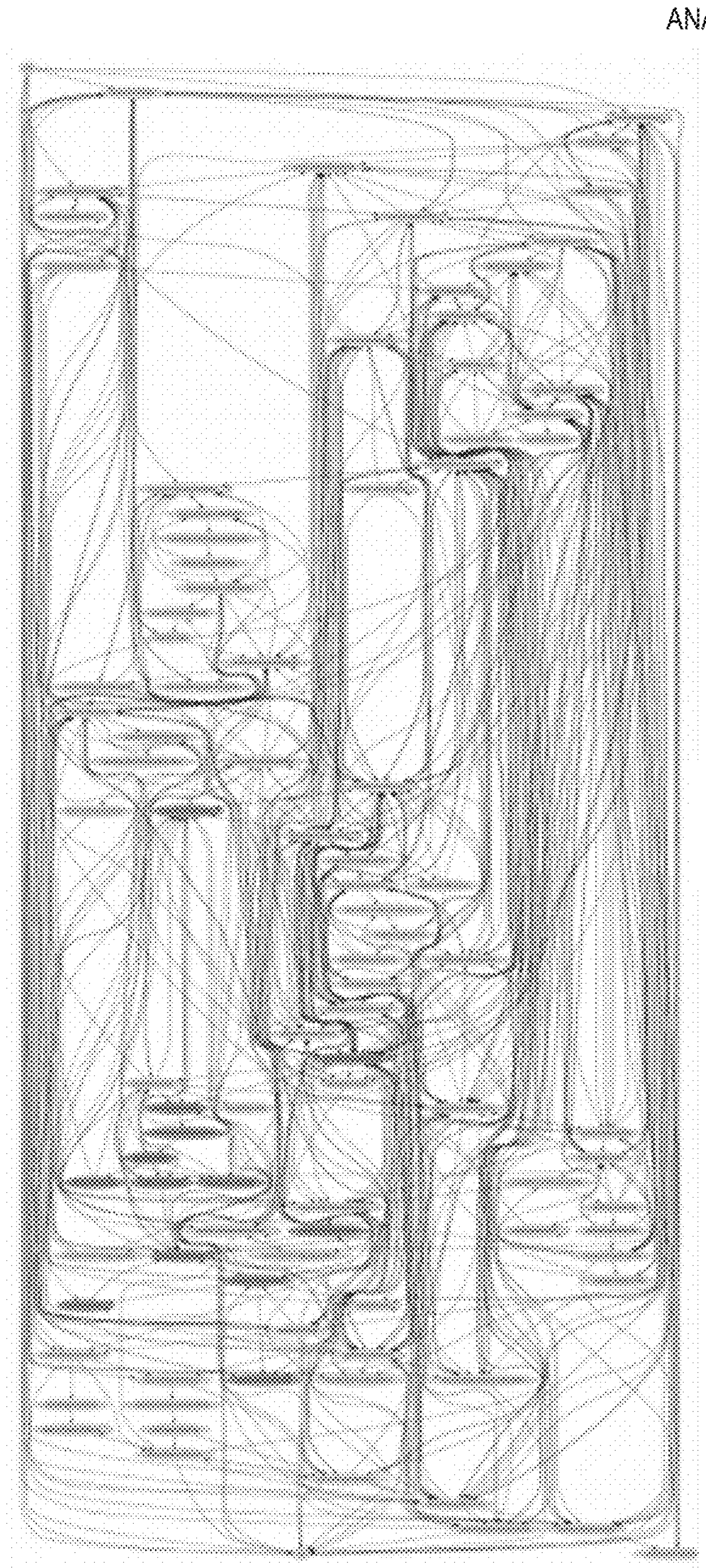
FIG. 4D shows an example analytical usage system graph, in accordance with aspects of the present invention.

FIG. 4D shows an example analytical system usage graph 431, which may be an implementation of analytical system usage graph 430 of FIG. 4A, in accordance with aspects of the present invention. Analytical system usage graph 431 shows all the interconnections between all of the user interactions in a selected interval of one or more user interaction sessions, and encapsulates patterns among the user interactions, in accordance with graph theory. (FIG. 4D conceptually illustrates analytical system usage graph 431, even while individual nodes, connections, and edges of the example graph are too numerous and fine to label individually on the scale of the figure.) Analytical system usage graph 431 may thus encode aspects of the higher meaning and purpose of the analytical work of a sophisticated knowledge worker using a sophisticated analytical system for particular purposes, such as financial, medical, or scientific research and analysis, in various examples. AI model recommendation code 200 generating analytical system usage graph 431 may be an example of generating, via graph generating module 202 as in FIG. 2, an interaction usage graph based on user interaction data on user interactions with an analytical system user interface, as at step 320 of FIG. 3, in various examples. AI model recommendation code 200 may generate analytical system usage graph 431 in accordance with the principles of graph theory. AI model recommendation code 200 may, for example, encode every discrete user action as a graph node comprising, at least, information of event triggered and UI target element, and add a directed graph edge connecting two nodes to represent each immediate chronological succession between the nodes for each pair of user actions performed in immediate chronological succession, such that the graph encodes all the numbers of times that each user action was performed, and in the chronological order in which they were performed. In this manner, analytical system usage graph 431 forms a mathematical structure in accordance with graph theory that represents complex sets of user interactions in a comprehensive way that is enabled for rich computing processing and analysis, such as translation into embeddings and further functions and steps as described herein.

Figure 4E:
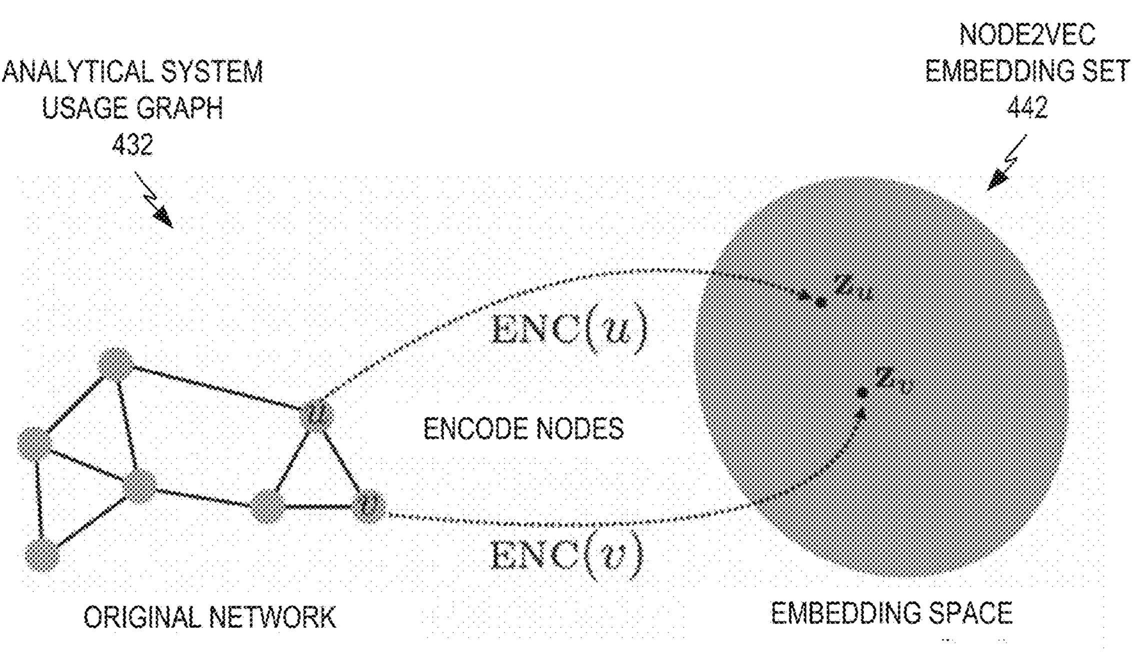
FIG. 4E shows an example simplified portion of a conceptual depiction of processing an analytical usage system graph into a user interaction node2vec embedding set, in accordance with aspects of the present invention.

FIG. 4E shows an example simplified portion of a conceptual depiction of processing an analytical usage system graph 432 into a user interaction node2vec embedding set 442, as an example of embeddings creation module 440 of creating a node2vec embedding set based on an analytical usage system graph as in FIG. 4A, in accordance with aspects of the present invention. FIG. 4E is a simplified conceptual depiction of a graph structure encoding e.g. thousands or millions of user interaction data points into a high-dimension (e.g., 100 or 200 dimension) vector or other tensor embedding space. Analytical usage system graph 432 may be an example of analytical system usage graph 430 or 431 of FIGS. 4A and 4D. AI model recommendation code 200 may perform and process the embedding of FIG. 4E as an example of interaction embedding model generating module 204 of FIG. 2 of AI model recommendation code 200 generating an interaction embedding model in a vector space based on the interaction usage graph, as at step 330 of FIG. 3, in various examples.

Analytical usage system graph 432 may have thousands, millions, or any number of nodes representing discrete user interactions, each of which AI model recommendation code 200 may process or encode into an embedding in a tensor embedding space in a machine learning embedding framework such as node2vec. While user interaction node2vec embedding set 442 is depicted as a simple graphical element in FIG. 4E, the embedding space may have tens or hundreds or other numbers of dimensions, defined in terms of matrixes, vectors or other order tensors, or octonions, and user interaction node2vec embedding set 442 may encode each of the thousands, millions, or other user interaction nodes in its own position among the hundreds or other number of dimensions of vectors or other dimensional bases of the embedding space, in various examples. The embedding set may flexibly encode semantic meaning of the collected user interactions, and pose an intelligent embodiment of the higher meaning and purpose of the collected user interactions, in a mathematical structure amenable to further AI analysis and processing, in various examples.

Referring again to FIG. 4A, AI model recommendation code 200, e.g., via embeddings similarity determination module 450, may illustratively calculate and determine a similarity measure such as a cosine similarity of user interaction node2vec embedding set 442 with one or more available AI models as represented in the embedding space, in accordance with similarity assessment techniques which may illustratively include determining a solution of the following cosine similarity equation $$\cos(\theta) = \frac{A \cdot B}{\|A\|\|B\|} = \frac{\sum_{i=1}^{n} A_i B_i}{\sqrt{\sum_{i=1}^{n} A_i^2}\sqrt{\sum_{i=1}^{n} B_i^2}} \quad \text{(Equation 1)}$$

where A is user interaction node2vec embedding set 442, B are the embedding sets of all of the one or more applicable and available AI models as represented in the form of, e.g., millions of embeddings in a tensor embedding space with hundreds of dimensions, i is an index of the embeddings, and n is the number of the embeddings. In a manner such as this, AI model recommendation code 200 may intelligently compare the overall semantic and functional similarity of the user interactions with available AI models based on, e.g., millions or any numbers of embeddings in a high-dimensional tensor embedding space, and reduce the overall semantic similarity to a single scalar number, as the cosine of the overall dot product of the two embedding sets scaled by the product of the absolute values of the two embedding sets.

AI model recommendation code 200 may determine and verify whether the cosine scalar value is at least or higher than a similarity threshold (e.g., 0.9, 0.97, 0.995, or another number, which may also be calibrated based on test results, in various examples), as in step 460 of FIG. 4A. AI model recommendation code 200 may select one or more AI models that AI model recommendation code 200 verifies as having at least the threshold similarity with the user interactions as matching, as in AI model matching module 470 of FIG. 4A. AI model recommendation code 200 may run the selected one or more AI models, as in step 480 of FIG. 4A. AI model recommendation code 200 may use results of running the selected one or more AI models as part of an output to recommend the selected one or more AI models and potentially to explain the significance or applicability of the selected one or more AI models to the user's work or how to use the selected one or more AI models in the user's work, in various examples. AI model recommendation code 200 may perform the similarity determination as described above as an example of similarity determining module 206 of FIG. 2 of AI model recommendation code 200 determining, based on the interaction embedding model in the vector space, a similarity of a portion of the interaction embedding model that corresponds to a particular analytical task among the user interactions with the analytical system user interface with a particular machine learning model from a set of one or more machine learning models, as at step 340 of FIG. 3, in various examples.

Figure 4F:
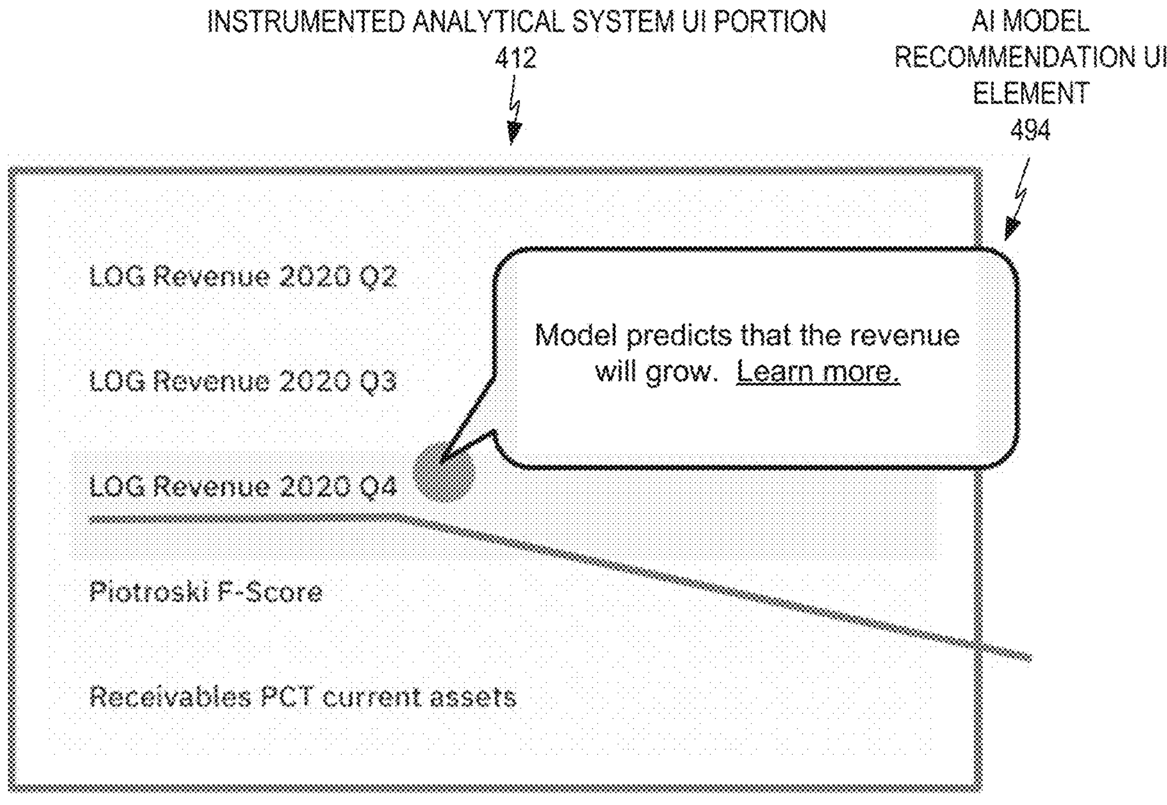
FIG. 4F shows an instrumented analytical system UI portion comprising an AI model recommendation UI element, which an AI model recommendation code may generate based on an analysis of the meaning and purpose of the collected user interactions as encoded in a node2vec embedding set, in accordance with aspects of the present invention.

FIG. 4F shows an instrumented analytical system UI portion 412 comprising an AI model recommendation UI element 494, which AI model recommendation code 200 may generate based on an analysis of the meaning and purpose of the collected user interactions as encoded in node2vec embedding set 442, in accordance with aspects of the present invention. AI model recommendation code 200 may generate and output AI model recommendation UI element 494 as an example of AI model recommendation generating and outputting module 490 of FIG. 4A, of generating an AI model recommendation based on an analysis of an AI embedding set based on the user interactions in comparison with the available AI models, and outputting the AI model recommendation via the analytical system UI, in various examples. AI model recommendation code 200 may generate and output AI model recommendation UI element 494 as an example of recommendation output module 208 of FIG. 2 of AI model recommendation code 200 outputting, to the analytical system user interface, an indication of the particular machine learning model, at step 350 of FIG. 3.

AI model recommendation code 200 may output AI model recommendation UI element 494 to a portion of instrumented analytical system UI 410 of FIG. 4B, thereby rendering the portion of instrumented analytical system UI 410 in a new state as instrumented analytical system UI portion 412, subsequent to the state of the UI shown in FIG. 4B, in some examples. AI model recommendation code 200 may interact with analytical system 220, superimpose its own UI element output over the analytical system UI 242 as generated by analytical system 220, or function as a component subsystem of analytical system 220 in generating and outputting AI model recommendation UI element 494 over or as part of instrumented analytical system UI 410 and analytical system UI 242 as generated and outputted by analytical system 220, in various examples.

As FIG. 4F shows, AI model recommendation code 200 may generate and output AI model recommendation UI element 494 adjacent to or otherwise in an indicative association with a UI element to which it is related, e.g., a quarterly revenue of a company being analyzed, as in the example of FIG. 4F. AI model recommendation UI element 494 may include a brief explanation of a result of running the selected relevant AI model, such as to indicate that the selected AI model predicts that revenue will undergo future growth, as shown in the example of FIG. 4F. AI model recommendation UI element 494 may also include a portion for enabling the user to access further information and explanation about the selected one or more AI models relevant to the user's work, such as via a user-electable link that reads, "Learn more." as in the example of FIG. 4F.

AI model recommendation generating and outputting module 490 of FIG. 4A may thus output, to the analytical system user interface, an indication of similarity of the particular machine learning model with the particular analytical task, in various examples. As shown and described, AI model recommendation code 200 may also use the particular machine learning model to generate a result related to the particular analytical task, and output, to the analytical system user interface, the result related to the particular analytical task.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

generating, by a processor set, an interaction usage graph based on user interaction data on user interactions with an analytical system user interface, wherein the interaction usage graph comprises a directed graph of ordered user interface events;

generating, by the processor set, an interaction embedding model in a vector space based on the interaction usage graph, including generating graph embeddings from the interaction usage graph;

determining, by the processor set and based on the interaction embedding model in the vector space, a similarity of a portion of the interaction embedding model that corresponds to a particular analytical task among the user interactions with the analytical system user interface with a particular machine learning model from a set of one or more machine learning models, wherein the portion of the interaction embedding model that corresponds to the particular analytical task is based on identifying a sub-task or user interface region associated with the user interactions; and outputting, by the processor set, to the analytical system user interface, an indication of the particular machine learning model.

2. The method of claim 1, further comprising:

outputting, to the analytical system user interface, an indication of similarity of the particular machine learning model with the particular analytical task.

3. The method of claim 1, further comprising:

using the particular machine learning model to generate a result related to the particular analytical task; and outputting, to the analytical system user interface, the result related to the particular analytical task.

4. The method of claim 1, further comprising:

generating respective embedding models of the one or more machine learning models in the vector space.

5. The method of claim 1, further comprising determining that the similarity of the portion of the interaction embedding model that corresponds to the particular analytical task with the particular machine learning model passes a selected threshold of similarity.

6. The method of claim 5, wherein determining the similarity of the portion of the interaction embedding model that corresponds to the particular analytical task with the particular machine learning model comprises detecting a similarity measure of the portion of the interaction embedding model that corresponds to the particular analytical task with an embedding model corresponding to the particular machine learning model in the vector space.

7. The method of claim 6, further comprising detecting that the similarity measure of the portion of the interaction embedding model that corresponds to the particular analytical task with the embedding model corresponding to the particular machine learning model in the vector space passes a selected threshold of cosine similarity.

8. The method of claim 5, further comprising reducing the selected threshold of similarity based on updated similarity evaluation criteria learned from prior determinations of similarity of portions of the interaction embedding model with the one or more machine learning models.

9. The method of claim 1, further comprising:
detecting the user interactions with the analytical system user interface; and
generating user interaction logs based on the user interactions,
wherein receiving the user interaction data comprises receiving the user interaction logs.

10. The method of claim 9, wherein detecting the user interactions with the analytical system user interface comprises detecting high-granularity interaction data comprising page views, mouse movements, mouseover actions, mouse fixation actions, icon selections, keyboard usage, keyboard shortcut selections, widget selections, interaction events with user interface elements, and timestamps of the interaction events.

11. The method of claim 1, wherein the directed graph represents the user interactions and an order in which the user interactions occurred, based on the user interaction data.

12. The method of claim 1, wherein generating the interaction embedding model in the vector space based on the interaction usage graph comprises processing the interaction usage graph with an algorithmic framework for representational machine learning on graphs.

13. The method of claim 12, wherein the algorithmic framework for representational machine learning on graphs comprises node2vec framework.

14. The method of claim 1, wherein the user interaction data comprises events, labels, targets, and identifiers, and the machine learning models comprise predictions and features.

15. A computer program product comprising one or more computer readable storage media having program instructions collectively stored on the one or more computer readable storage media, the program instructions executable to:
generate an interaction usage graph based on user interaction data on user interactions with an analytical system user interface, wherein the interaction usage graph comprises a directed graph of ordered user interface events;
generate an interaction embedding model in a vector space based on the interaction usage graph, including generation of graph embeddings from the interaction usage graph;
determine, based on the interaction embedding model in the vector space, a similarity of a portion of the interaction embedding model that corresponds to a particular analytical task among the user interactions with the analytical system user interface with a particular machine learning model from a set of one or more machine learning models, wherein the portion of the interaction embedding model that corresponds to the particular analytical task is based on identifying a sub-task or user interface region associated with the user interactions; and
output, to the analytical system user interface, an indication of the particular machine learning model.

16. The computer program product of claim 15, wherein the program instructions are further executable to:
output, to the analytical system user interface, an indication of similarity of the particular machine learning model with the particular analytical task;
use the particular machine learning model to generate a result related to the particular analytical task; and
output, to the analytical system user interface, the result related to the particular analytical task.

17. The computer program product of claim 15, wherein the program instructions are further executable to:
determine that the similarity of the portion of the interaction embedding model that corresponds to the particular analytical task with the particular machine learning model passes a selected threshold of similarity,
wherein determining the similarity of the portion of the interaction embedding model that corresponds to the particular analytical task with the particular machine learning model comprises detecting a similarity measure of the portion of the interaction embedding model that corresponds to the particular analytical task with an embedding model corresponding to the particular machine learning model in the vector space.

18. A system comprising:
a processor set, one or more computer readable storage media, and program instructions collectively stored on the one or more computer readable storage media, the program instructions executable to:
generate an interaction usage graph based on user interaction data on user interactions with an analytical system user interface, wherein the interaction usage graph comprises a directed graph of ordered user interface events;
generate an interaction embedding model in a vector space based on the interaction usage graph, including generation of graph embeddings from the interaction usage graph;
determine, based on the interaction embedding model in the vector space, a similarity of a portion of the interaction embedding model that corresponds to a particular analytical task among the user interactions with the analytical system user interface with a particular machine learning model from a set of one or more machine learning models, wherein the portion of the interaction embedding model that corresponds to the particular analytical task is based on identifying a sub-task or user interface region associated with the user interactions; and
output, to the analytical system user interface, an indication of the particular machine learning model.

19. The system of claim 18, wherein the program instructions are further executable to:
output, to the analytical system user interface, an indication of similarity of the particular machine learning model with the particular analytical task;
use the particular machine learning model to generate a result related to the particular analytical task; and
output, to the analytical system user interface, the result related to the particular analytical task.

20. The system of claim 18, wherein the program instructions are further executable to:
determine that the similarity of the portion of the interaction embedding model that corresponds to the particular analytical task with the particular machine learning model passes a selected threshold of similarity,
wherein determining the similarity of the portion of the interaction embedding model that corresponds to the particular analytical task with the particular machine learning model comprises detecting a similarity measure of the portion of the interaction embedding model that corresponds to the particular analytical task with an embedding model corresponding to the particular machine learning model in the vector space.

* * * * *